United States Patent Office 2,855,899
Patented Oct. 14, 1958

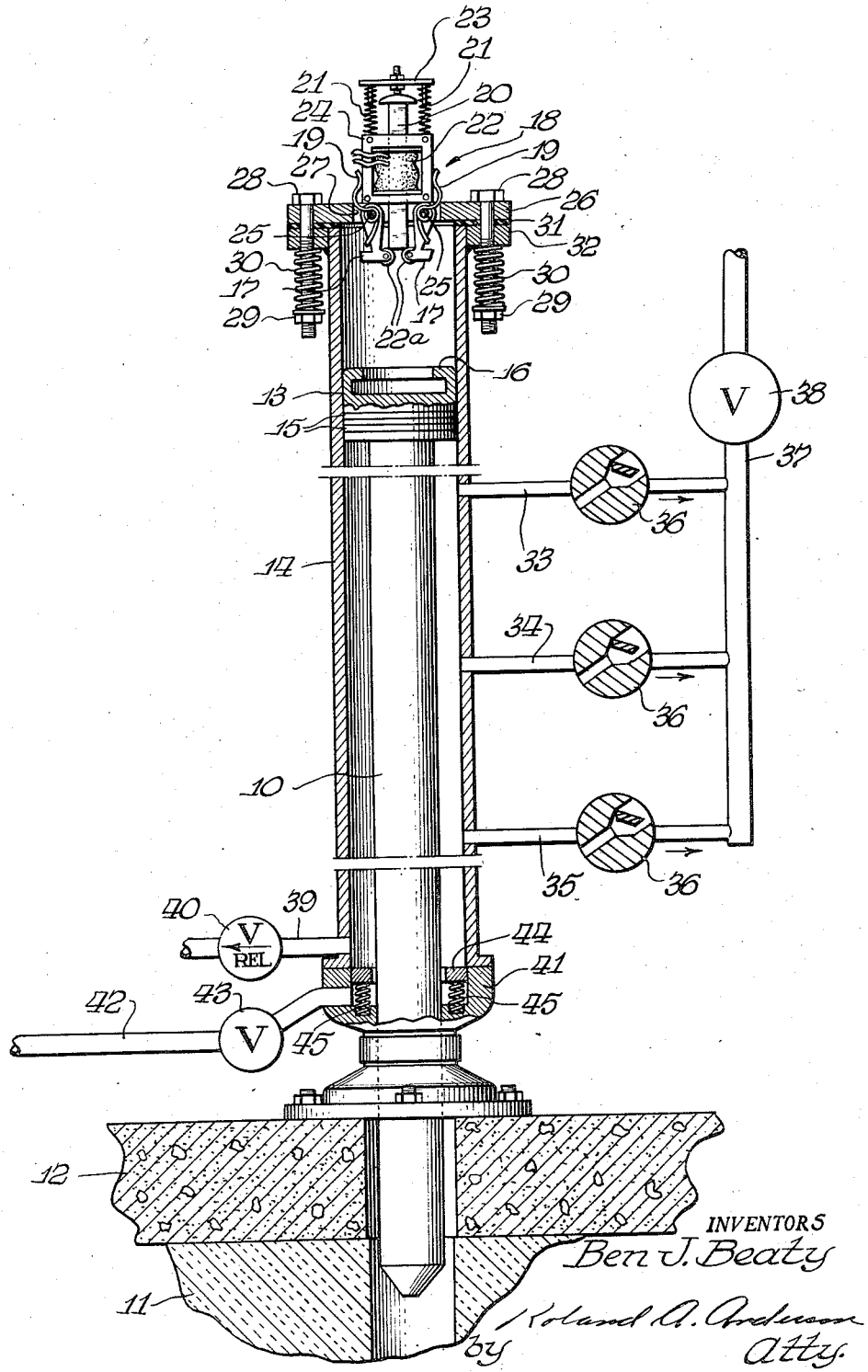

2,855,899

DEVICE FOR CONTROLLING INSERTION OF ROD

Ben J. Beaty, Cincinnati, Ohio, assignor to the United States of America as represented by the United States Atomic Energy Commission Application May 2, 1956, Serial No. 582,305

1 Claim. (Cl. 121—40)

This invention relates to a device for inserting an article such as a rod into an apparatus and for withdrawing the article from the apparatus.

It is known to control the operation of a nuclear reactor by lowering a vertical neutron-absorbing rod into the reactor. Under certain conditions it is very important that the rod be moved into the reactor as rapidly as possible, and yet care must be taken during rapid insertion of the rod that damage not be done to the reactor or the rod.

An object of the present invention is to provide a device for moving a rod-like article rapidly into an apparatus without damage to the article or the apparatus.

According to the present invention, a rod is dropped into an apparatus such as a nuclear reactor so that it encounters during the last part of its fall a cushion that prevents the occurence of damage to the rod or the apparatus.

The single figure of the drawing shows the novel device of the present invention partially in section and partially diagrammatically.

A safety rod 10, which includes one or more sections formed of neutron-absorbing material such as cadmium, is shown a little below completely raised or withdrawn position, with its lower end in shielding sections 11 and 12 on the top of a nuclear reactor.

A piston 13 is fixed to the upper end of the safety rod 10 and is larger in diameter than the rod. The piston is slidable in a vertical cylinder 14 and carries sealing rings 15 which provide a seal between the piston and the cylinder. The piston 13 has a hollow upper end and an inwardly directed circumferential flange 16 overhanging the same.

The rod 10 is sustained in fully raised or withdrawn position, somewhat above that shown in the drawing, through engagement of the piston flange 16 with hook members 17 of a latch 18. The latch also comprises springs 19 on the hook members 17, an armature 20 of magnetic material such as soft iron, springs 21 acting against the armature 20, and a magnetic coil 22.

When the coil 22 is energized by an electric current, the armature 20 is pulled downward against rollers 22a carried by the hook members 17, moving them outward away from one another to positions in which they will engage the lower inner side of the piston flange 16, whereby the rod 10 is supported in its fully raised position. When the coil 22 is deenergized, the springs 21, which act between a cross piece 23 bolted to the upper end of the armature 20 and a frame 24 in which the magnetic coil 22 is positioned, move the armature 20 upward. The springs 19 move the hook members 17 toward one another and out of engagement with the piston flange 16. The safety rod 10 now falls.

The hook members 17 are pivotally connected by pins 25 to an end plate 36 which is at the upper end of the cylinder 14. The frame 24 is secured to the plate 26. This plate has an opening 27 which receives the upper ends of the hook member 17 and across which the pivot pins 25 for the hook members 17 extend. The plunger 20 extends through the opening 27. The opening 27 prevents air from being trapped in the cylinder 14 above the piston 13. The plate 26 is yieldingly secured to the upper end of the cylinder 14 by means of bolts 28, nuts 29 on the bolts, and springs 30 on the bolts. The bolts 28 go through the plate 26, through a rubber washer 31 on which the plate 26 rests, and through a flange ring 32 upon which the washer 31 rests and which is secured by soldering or welding to the upper end of the cylinder 14. The springs 30 act between the ring 32 and the nuts 29.

At regions of the cylinder 14 intermediate its upper and lower ends there is connected a plurality of lines which in the example illustrated in the drawing are three in number and are numbered 33, 34, and 35 from top to bottom. The lines 33, 34 and 35 provide escape openings in the cylinder and are each provided with check valves 36. The lines 33, 34, and 35 are connected with a common exhaust line 37 which is controlled by a valve 38. At the lower end of the cylinder 14 there is connected a line 39 to which is controlled by a relief valve 40.

The lower end of the cylinder 14 is secured to a fitting 41 which is secured to the shielding section 12 and thus provides a mounting for the cylinder 14 on the reactor. A supply line 42, which is controlled by a valve 43, is connected to the fitting 41. In the position shown in the drawing the lower end of the safety rod 10 goes through the fitting 41 which carries a seal, not shown, in engagement with the rod, the seal preventing escape of gas from the lower end of the cylinder 14 by way of the fitting 41 and also preventing escape of gas or liquid from the reactor through the holes in the shielding sections 11 and 12 which receive the rod 10. A ring 44, which is mounted in the fitting 41 on springs 45, cushions the piston 13 when the safety rod 10 is in its lowest or inserted position.

In a completely raised position the rod 10 will be supported through the latch 18, the hook members 17 engaging the flange 16 on the piston 13 because of pressure of the armature 20 against the rollers 22a on the hook members 17 due to energization of the coil 22. As previously explained, deenergization of the coil 22 permits the springs 21 and 19 to lift the armature 20 and move the hook members 17 inwardly toward one another out of engagement with the piston flange 16, whereupon the safety rod 10 falls.

Let us assume that the valve 38 on the exhaust line 37 is open, the check valves 36 in the lines 34 and 35 and the valve 43 in the supply line 42 are closed, and the check valve 36 in line 33 is open. Until the piston 13 reaches the line 33, the rod 10 falls freely subject only to the friction between the cylinder 14 and the piston 13 or its rings 15 and to the restriction on the speed with which the air in the cylinder 14 below the piston 13 can escape through the lines 33 and 37. Once the piston 13 reaches the line 33, the air in the cylinder 14 below the piston is trapped and serves as a cushion that slows the further fall of the safety rod 10, bringing the same to a stop in its fully inserted position without damage to the rod or to the parts of the reactor with which the rod contacts in its fully inserted position. The relief valve 40 limits the maximum pressure developed in the trapped column of air in the cylinder 14 and thus prevents or reduces any bouncing of the piston 13 on the trapped column of air.

In a modified manner of operation, the check valve 36 in the line 34 is left open, and now air is not trapped in the cylinder 14 below the piston 13 until the piston reaches the line 34. In this operation the relatively free fall of the safety rod 10 continues through a greater amount of the total travel of the rod. It is to be noted that the rod 10 falls a little less freely while the piston 13 is traveling between the lines 33 and 34 than before it has reached the line 33, because the air below the piston exhausts in the first case from the cylinder 14 through only the line 33 and in the second case through lines 33 and 34.

In a second modified manner of operation, the check valves 36 in all three lines 33, 34, and 35 are left open. Now relatively free fall of the rod 10 lasts until the piston 13 reaches the line 35, whereupon further fall of the rod is cushioned by the air trapped in the cylinder 14 below the piston 13. When the piston 13 reaches the line 33, the air escapes from the cylinder 14 through two lines 34 and 35, rather than three lines 33, 34, and 35, and so the fall of the piston is slowed slightly. When the piston 13 reaches the line 34, the fall of the rod 10 is slowed a little more, because air escapes from the cylinder 14 through only the one line 35, rather than through the two lines 34 and 35.

When the safety rod 10 is to be raised from its lowest or fully inserted position to its highest or completely withdrawn position, the valve 38 in the exhaust line 37 is closed, the valve 43 is opened, and a gas such as air is fed under pressure through the supply line 42 to the lower end of the cylinder 41 and against the piston 13. The rod 10 and piston 13 rise until the piston flange 16 is engaged by the hook members 17, which will meanwhile have been moved outward away from one another by downward movement of the armature 20 produced by energization of the coil 20. When the piston flange 16 is being moved upwardly against the thus outwardly displaced hook members 17, they are cammed inwardly, because the armature 20, being only resiliently held in its lowest position by the coil 22, will yield upwardly under the force applied against it by the hook members 17. Any shock imposed by too rapid movement of the piston 13 against the latch 18 will be taken up by the springs 30, which form a part of the mounting of the latch 17 on the upper end of the cylinder 14.

When the rod 10 is to be raised, it may be necessary to adjust the relief valve 40 to increase the gas pressure that the relief valve will allow in the cylinder 14 below the piston 13.

When during the upward movement of the rod 10, the piston has passed the line 35, but not the line 33 or the line 34, the gas in the cylinder 14 below the piston 13 cannot escape to the cylinder above the piston through the lines 35, 37, and 34 and/or 33, because the check valves 36 in the lines 33 and 34 will not permit gas to flow in a direction from the exhaust line 37 to the cylinder 14.

The intention is to limit the invention only within the scope of the appended claim.

What is claimed is:

An assembly comprising a vertical rod, a piston secured to the upper end of the rod, a vertical cylinder slidably mounting the piston and having a lower end portion slidably mounting the rod, and means providing an escape opening for gas in the cylinder at a region thereof intermediate its upper and lower ends, whereby fall of the rod is free until the piston passes the escape opening, whereupon gas trapped between the escape opening and the lower end of the cylinder cushions the further fall of the rod, the piston being provided with an inwardly directed circumferential flange at its upper end, the assembly further comprising a latch having opposed hook members engageable with the flange on the piston and a plunger positionable between the latch members to hold them apart and in engagement with the piston flange.

References Cited in the file of this patent

UNITED STATES PATENTS

| | | |
|---|---|---|
| 840,877 | Steedman | Jan. 8, 1907 |
| 1,807,231 | Weeks | May 26, 1931 |
| 2,241,184 | Clark | May 6, 1941 |